(12) United States Patent
Baxter, Jr.

(10) Patent No.: US 10,495,063 B2
(45) Date of Patent: Dec. 3, 2019

(54) WIND TURBINE

(71) Applicant: CBC, LLC, Warwick, RI (US)

(72) Inventor: Robert Baxter, Jr., Warwick, RI (US)

(73) Assignee: CBC, LLC, Warwick, RI (US)

( * ) Notice: Subject to any disclaimer, the term of this patent is extended or adjusted under 35 U.S.C. 154(b) by 261 days.

(21) Appl. No.: 15/672,388

(22) Filed: Aug. 9, 2017

(65) Prior Publication Data
US 2018/0135599 A1 May 17, 2018

Related U.S. Application Data

(60) Provisional application No. 62/374,847, filed on Aug. 14, 2016.

(51) Int. Cl.
*F03D 3/00* (2006.01)
*F03D 7/06* (2006.01)
*F03D 3/04* (2006.01)
*F03D 3/06* (2006.01)

(52) U.S. Cl.
CPC ............ *F03D 7/06* (2013.01); *F03D 3/0418* (2013.01); *F03D 3/061* (2013.01); *F03D 3/005* (2013.01); *F05B 2220/706* (2013.01); *F05B 2240/30* (2013.01); *F05B 2250/25* (2013.01)

(58) Field of Classification Search
CPC .......... F03D 3/00; F03D 3/005; F03D 3/0427; F03D 3/0435; F03D 3/0445; F03D 3/0481; F03D 3/049; F03D 7/06; F03D 3/0418; F03D 3/061; F05B 2240/211; F05B 2240/30; F05B 2250/25
See application file for complete search history.

(56) References Cited

U.S. PATENT DOCUMENTS

| | | | |
|---|---|---|---|
| 4,075,500 A * | 2/1978 | Oman | F03D 1/04 290/55 |
| 4,309,146 A * | 1/1982 | Hein | F03D 1/04 415/4.4 |
| 4,313,710 A * | 2/1982 | La Ferte | F03D 3/0409 415/4.2 |
| 4,834,610 A * | 5/1989 | Bond, III | F03D 7/06 415/141 |

(Continued)

FOREIGN PATENT DOCUMENTS

| | | |
|---|---|---|
| DE | 202015000588 U1 | 2/2015 |
| EP | 2617991 A1 | 7/2013 |

(Continued)

*Primary Examiner* — Thomas N Moulis
(74) *Attorney, Agent, or Firm* — Barlow, Josephs & Holmes, Ltd.

(57) ABSTRACT

A vertical axis wind turbine having a platform and a roof forming a housing for a vertical axis rotor and a stator. Stator vanes extend between the platform and the roof. The stator vanes and guiding surfaces on the platform and the roof define inlets and airflow paths for guiding wind into the inner chamber of the housing, where the wind powers a vertical axis rotor that is rotatably supported on the platform. The stator vanes are segmented with the trailing edges dynamically adjusting the diameter of the inner chamber in response to changing wind and rotor speed conditions. A shaft extending from the rotor can be connected to a generator connected to a power grid. The roof can support a solar panel connected to the power grid.

15 Claims, 14 Drawing Sheets

(56) References Cited

U.S. PATENT DOCUMENTS

| | | | | |
|---|---|---|---|---|
| 5,380,149 | A * | 1/1995 | Valsamidis | F03D 3/0409 415/2.1 |
| 5,391,926 | A * | 2/1995 | Staley | F03D 3/0409 290/55 |
| 6,015,258 | A * | 1/2000 | Taylor | F03D 3/0409 415/4.4 |
| 6,191,496 | B1 * | 2/2001 | Elder | F03D 3/0409 290/55 |
| 6,465,899 | B2 * | 10/2002 | Roberts | F03D 3/0409 290/44 |
| 6,666,650 | B1 * | 12/2003 | Themel | B64C 11/48 416/200 R |
| 6,740,989 | B2 | 5/2004 | Rowe | |
| 6,841,894 | B2 * | 1/2005 | Gomez Gomar | F03D 3/0409 290/55 |
| 6,870,280 | B2 | 3/2005 | Pechler | |
| 6,984,899 | B1 * | 1/2006 | Rice | F03D 3/049 290/44 |
| 7,315,093 | B2 | 1/2008 | Graham, Sr. | |
| 7,573,148 | B2 | 8/2009 | Nica | |
| 7,759,812 | B2 * | 7/2010 | Taylor | H01M 8/0656 290/44 |
| 7,802,967 | B2 * | 9/2010 | Krauss | F03D 3/005 415/4.2 |
| 7,969,036 | B2 * | 6/2011 | Chung | F03D 3/0427 290/55 |
| 8,257,020 | B2 | 9/2012 | Graham, Sr. | |
| 8,446,028 | B2 | 5/2013 | Chung | |
| 8,459,930 | B2 | 6/2013 | Krippene | |
| 8,511,965 | B2 | 8/2013 | Vaz | |
| 8,534,992 | B2 | 9/2013 | Presz, Jr. | |
| 9,062,655 | B2 * | 6/2015 | Scott | F03D 3/0409 |
| 9,074,580 | B2 * | 7/2015 | Curtis | F03D 3/02 |
| 9,512,815 | B2 * | 12/2016 | Bae | F03B 17/063 |
| 9,951,628 | B2 * | 4/2018 | Devisch | F03D 3/0409 |
| 2003/0133782 | A1 * | 7/2003 | Holter | F03D 3/005 415/4.2 |
| 2003/0209911 | A1 * | 11/2003 | Pechler | F03D 3/0427 290/55 |
| 2004/0036297 | A1 * | 2/2004 | John | F03D 3/0409 290/55 |
| 2006/0222483 | A1 * | 10/2006 | Seiford, Sr. | F03D 3/005 415/4.4 |
| 2006/0275105 | A1 * | 12/2006 | Roberts | F03D 3/061 415/4.2 |
| 2007/0296219 | A1 * | 12/2007 | Nica | F03D 3/0409 290/55 |
| 2012/0119504 | A1 * | 5/2012 | Vigaev | F03D 3/02 290/55 |
| 2013/0115069 | A1 * | 5/2013 | Zha | G03D 3/0409 415/191 |
| 2013/0149131 | A1 | 6/2013 | O'Keefe | |
| 2013/0156581 | A1 * | 6/2013 | Chung | F03D 3/0418 416/155 |
| 2015/0098828 | A1 * | 4/2015 | Devisch | F03D 3/0409 416/176 |
| 2015/0152840 | A1 * | 6/2015 | Varga | F03D 15/10 416/126 |
| 2016/0195065 | A1 | 7/2016 | Zha et al. | |
| 2017/0009736 | A1 | 1/2017 | Behrens | |

FOREIGN PATENT DOCUMENTS

| | | |
|---|---|---|
| GB | 2502979 A | 12/2013 |
| KR | 100654246 B1 | 11/2006 |
| KR | 101006171 B1 | 1/2011 |
| KR | 101024311 B1 | 3/2011 |
| KR | 20110040328 A | 4/2011 |
| KR | 101637907 B1 | 7/2016 |

* cited by examiner

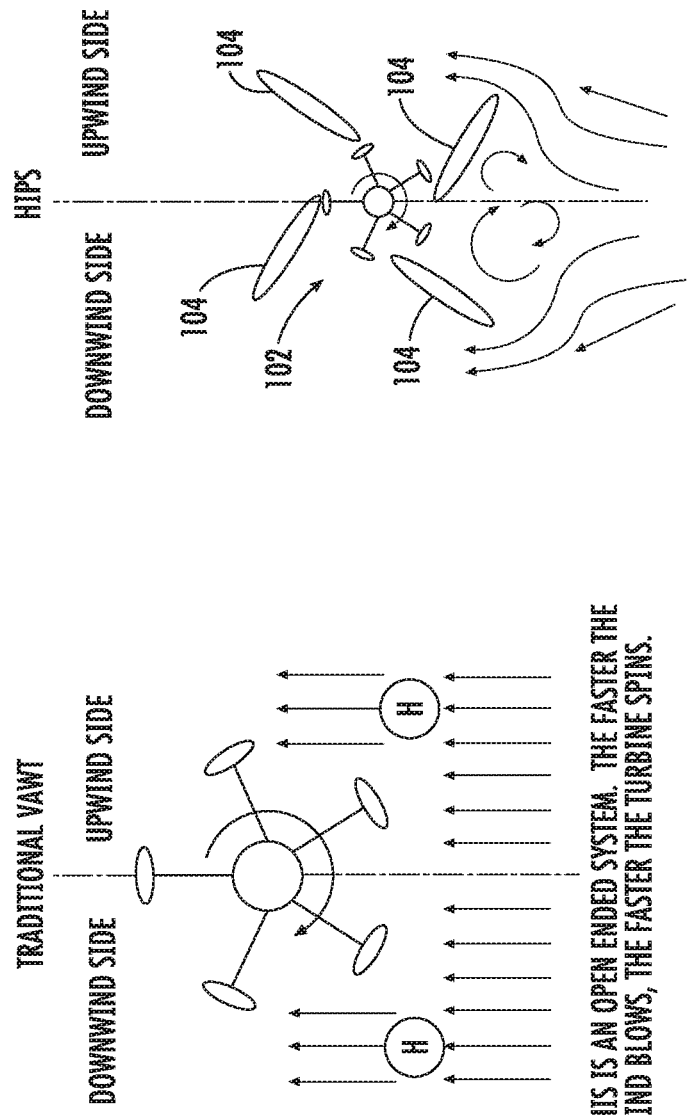

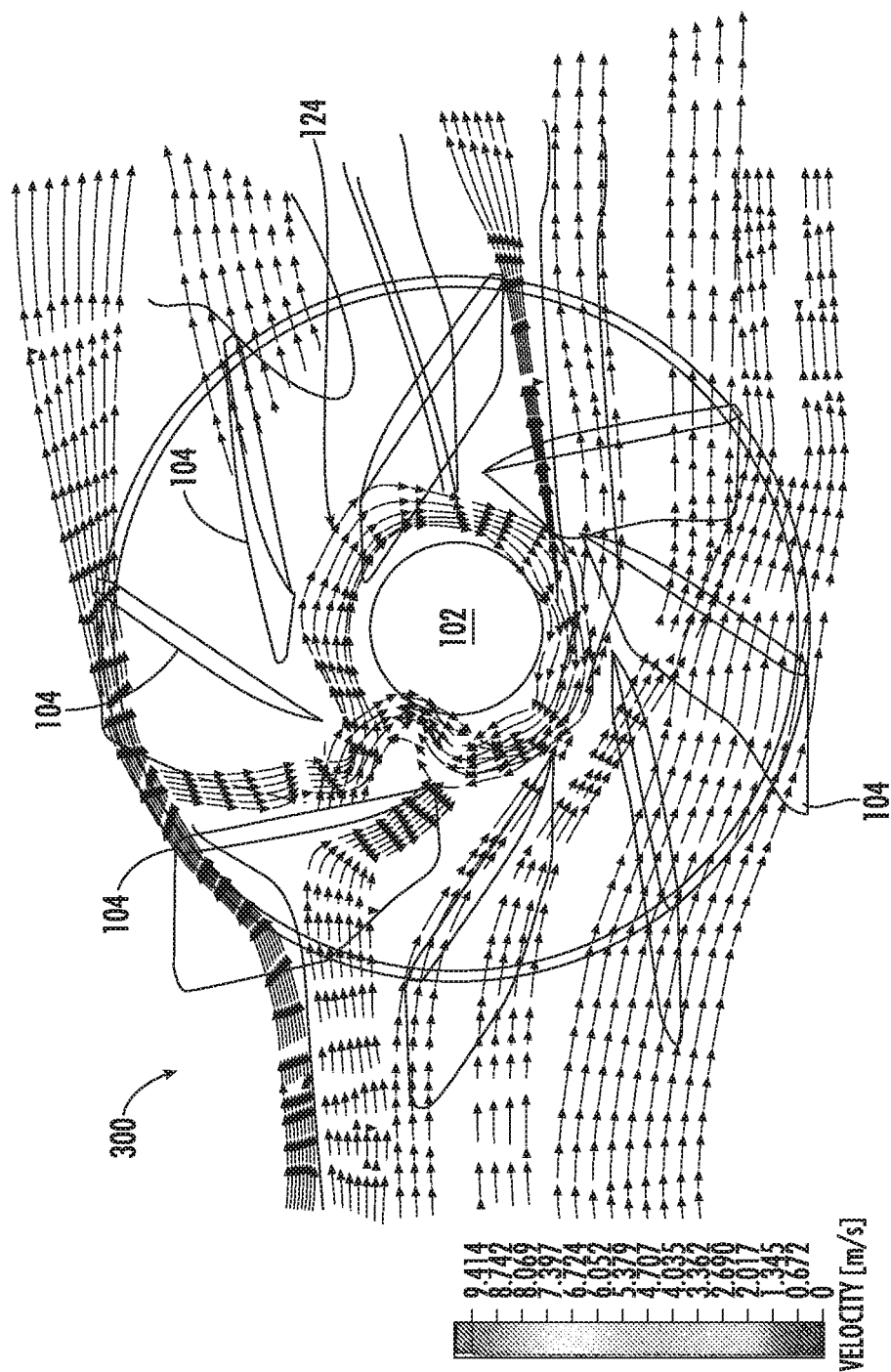

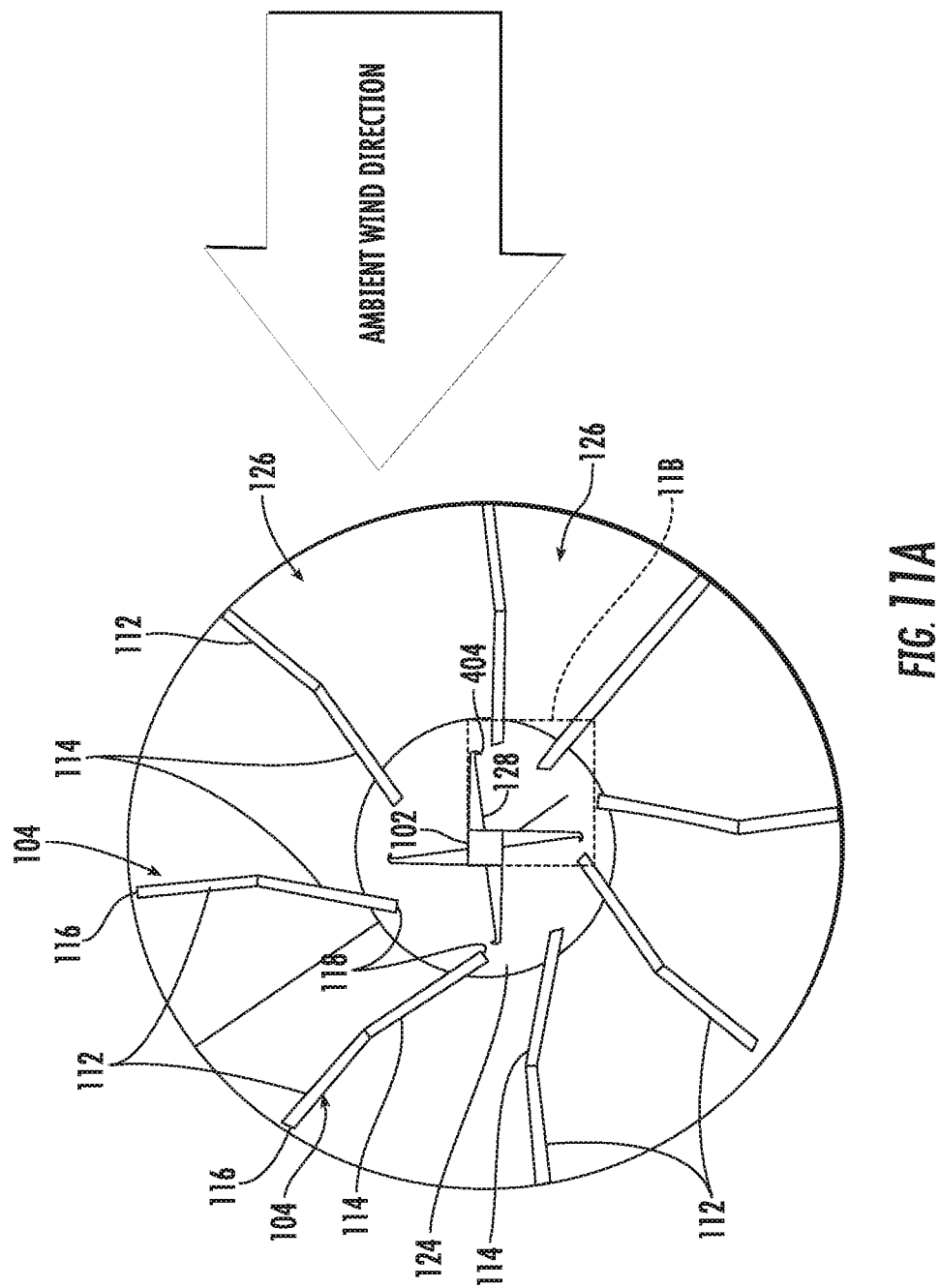

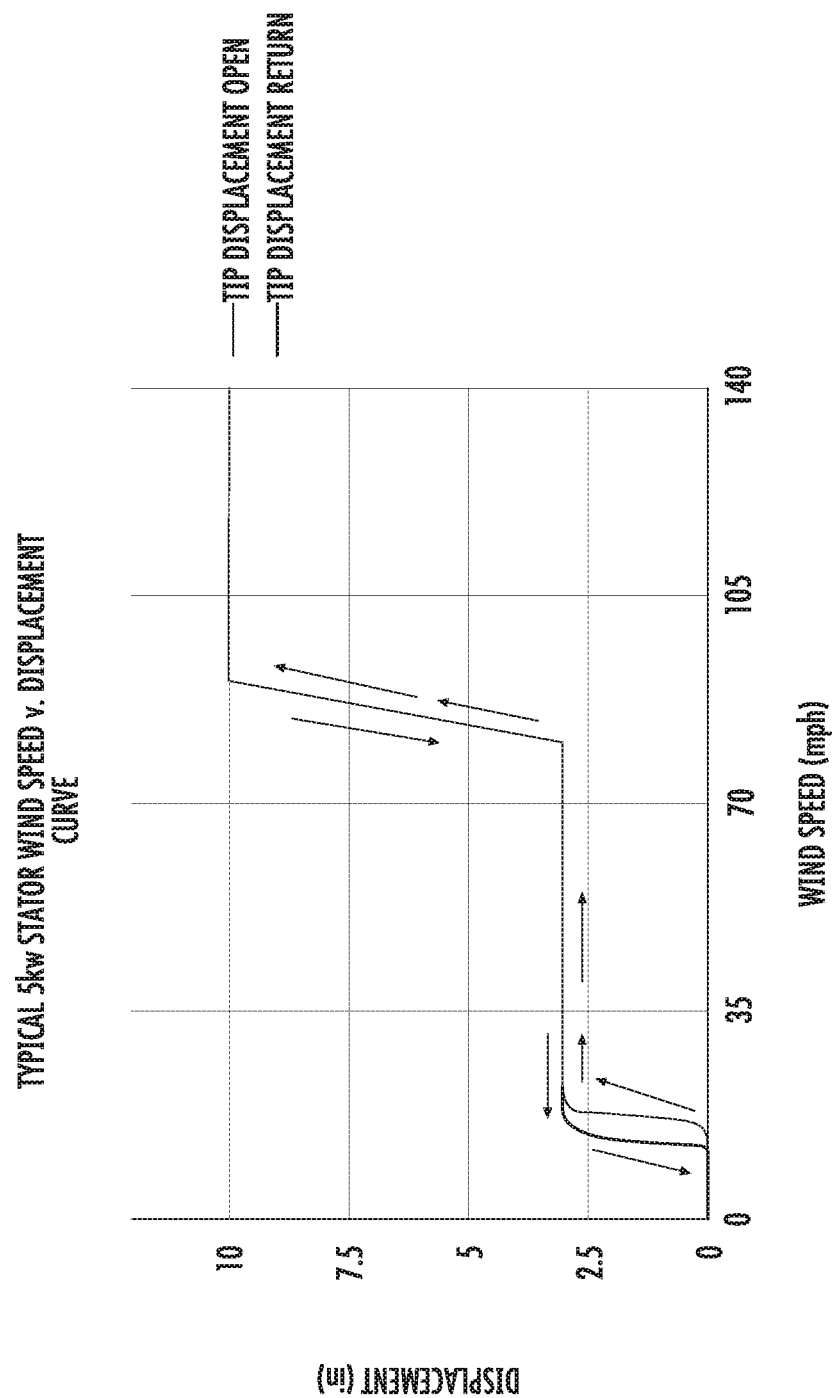

WIND TURBINE

CROSS-REFERENCE TO RELATED APPLICATION

This patent document claims priority to earlier filed U.S. Provisional Application Ser. No. 62/374,847, filed Aug. 14, 2016, the entire contents of which are incorporated herein by reference.

BACKGROUND OF THE INVENTION

The instant invention relates to wind energy conversion systems, specifically wind turbines.

The instant invention provides an omnidirectional, self-braking wind turbine. The wind turbine is suitable for a variety of built environment locations, such as airports and residential areas, as will become apparent in the description below.

Traditional horizontal axis wind turbines are mast mounted devices, which often interfere both aesthetically and physically with their surroundings. Their height both clutters the viewscape and makes them incompatible with the intended purpose of many of the windiest areas such as airports, metropolitan roof tops, and the shoreline.

Traditional wind turbines present a host of objections from neighbors. For example, traditional wind turbines cause shadow flicker as the blades rotate, falling ice when ice builds up on the blades and is then flung off, noise, and harm to wildlife. As a result, they are generally located away from populated areas where the power is needed, creating a power transport challenge, which limits the devices' effectiveness. Also, these objections pose significant challenges and delays during the permitting and approvals process, further complicating, and possibly preventing, the implementation of a wind energy project.

Traditional wind turbines are generally designed with large blades to intercept more wind and generate more power. This addition of moving mass increases their inefficiency because it requires more energy to get started, and aggravates many of the neighbor objections mentioned above. This additional size also complicates the mechanisms needed to control turbine speed and to brake the turbine in high winds.

Traditional horizontal axis wind turbines must be pointed into the wind. The increased size of traditional turbines makes the turbines less responsive to wind direction volatility. Even when the turbines are responsive to changes in wind direction, the mechanism to orient the turbines into the wind is complex, and is another source of failure.

Mast mounted devices require expensive site preparation and excavation, an expensive foundation, and heavy equipment. They are complicated and expensive to construct. Their geometry and complex mechanism create more opportunity for failure, increase both cost and downtime, and are challenging for technicians to access and maintain.

U.S. Pat. No. 8,459,930 discloses a vertical multi-phased wind turbine system. In particular, the vertical axis wind turbine uses an adjustable air scoop inlet section having variable geometry. The air scoop is adjustable so that it can be repositioned into the wind.

U.S. Pat. No. 8,534,992 to FloDesign Wind Turbine Corp. discloses a wind turbine that needs to be pointed into the wind. The geometry of the wind turbine limits the amount of wind that can be collected. This wind turbine is tower mounted and is incompatible with mounting on a building.

U.S. Pat. Nos. 8,257,020 and 7,315,093 teach wind turbine systems for buildings. According to these patents, the wind turbine system is placed at the edge of a building rooftop or built into the eaves, and is not suited for metropolitan or commercial applications, because the invention relies on a pitched roof to function, and commercial buildings have flat roofs. It is unidirectional, and it is size limited. The wind turbine system cannot be mounted at the center of a building, limiting its use and effectiveness.

U.S. Pat. No. 6,740,989 discloses an enclosed vertical axis wind turbine with focus on a turbulence causing flange on the leading edge of the stator and with a solid rotor. However, the shape of the rotor blades and the configuration of the chamber and enclosure face result in a significantly higher start up wind speed and inefficient use of the wind energy than the current state of the art.

U.S. Pat. No. 6,870,280 discloses an enclosed vertical axis wind turbine similar to McCamley in that the blades of the rotor do not touch and with curved stators and multiple levels. Because the invention relies on curved stators and an open rotor configuration and has a plurality of horizontal plates along its height, this invention has a higher start-up wind speed, is less efficient, is more difficult to brake and scale.

Similarly, Building Turbines, Inc. offers unidirectional turbines that must be at the edge of the building, limiting their use and effectiveness. The turbines blades are less durable because of the shape of their design and their fabric construction.

McCamley Middle East produces small scale wind turbines that are not self limiting, and do not have braking capabilities. The McCamley wind turbine is only 12 kW and is tower mounted. The design cannot be scaled to provide power to a large building. It has an upwind/downwind problem. It operates more like a vertical axis wind turbine than a backward curved impeller.

Other state of the art features bulbous and/or curved airfoil like stators which our research has demonstrated to hamper effectiveness. It features continuous, stationary stators which cannot adjust as wind speed and subsequent rotor rotation velocity increases, and thus hamper performance and is difficult to brake. It also features stators along the radial lines from the center of the rotor thus not optimizing direction and velocity of air injection into the chamber.

None of the prior art is able to start up at low wind speeds and reach full power at wind speeds as low as 15 mph. Nor can it be scaled to provide ample power for airports or other structures with populations having significant power demand (for example, in the range of 100 kW-200 kW).

SUMMARY OF THE INVENTION

The wind turbine of the present invention provides a fixed housing that encloses a vertical axis turbine rotor and stators.

The housing has a substantially horizontal platform with a substantially horizontal roof platform. The housing is translationally and rotationally fixed above a generator by a support structure or a support frame.

Air is directed towards the rotor by substantially planar stator vanes, which are supported between the platform and roof. The stator vanes extend inwardly from the peripheral edge of the housing. The stator vanes are segmented into two sections. Guiding surfaces on the platform and roof, together with the stator vanes, define inlets and airflow paths for guiding wind from outside of the housing into an inner chamber within the housing, where the wind powers a rotor.

The rotor has a center hub with rotor blades extending outwardly. The rotor blades are substantially evenly spaced apart and are significantly distanced from each other. The diameter of the center hub is small in proportion to the diameter of the inner chamber. The rotor's axis of rotation is substantially collinear with the vertical axis of the center of the inner chamber. Wind directed through the airflow paths acts on the rotor blades to rotate the rotor relative to the enclosure. Air exits the inner chamber at the opposite sides of the housing from the airflow path through which the air entered.

To produce electrical power, rotation of the rotor drives a generator, which is connected to a power grid or battery. A shaft is secured to the rotor base and extends downwardly from the drum, through a shaft hole in the platform. The lower end of the shaft is configured to engage a generator. The shaft is substantially collinear with the vertical axis.

At high wind speeds, the stators can be trimmed to protect the rotor by minimizing the wind load on the rotor. The enclosure can be trimmed to use turbulence inside the chamber to interfere with stators and thus inhibit rotor rotation and brake the system. The stators can be further trimmed to prevent airflow from altogether reaching the chamber. In this case, the wind sees the enclosure as a substantially solid structure and flows around the structure. This prevents the rotor blades from being exposed to high wind speeds.

For additional power generation, the roof is configured to support a solar panel that is connected to a power grid. The solar panel does not interfere with the operation of the rotor of the vertical axis wind turbine.

Accordingly, among the objects of the instant invention are: the provision of a wind turbine that is capable of extracting a significant amount of power (100 kW-200 kW) from wind in populated locations while being compatible with the intended use of the built environment location.

It is further an object of the present invention to eliminate objections from neighbors to things like shadow flicker, falling ice, noise, and harm to wildlife.

It is further an object of the present invention to make the device compatible with mounting on a commercial building, similar to a commercial HVAC unit.

It is further an object of the present invention to provide a system that is omnidirectional, rather than uni-directional, and is capable of performing in volatile wind conditions.

It is further an object of the present invention to intercept enough wind to power a 100 kW-200 kW generator without significantly increasing the moving mass of the turbine blades.

It is further an object of the present invention to provide a wind turbine that is self-braking and/or speed limiting.

It is further an object of the present invention to provide a wind turbine that is constructed to shape that can be easily modified to achieve the appearance of another structure.

It is further the object of the present invention to have a mathematical model to use to size systems for various power outputs based upon unique site constraints, generator torque and RPM requirements and wind conditions.

Other objects, features and advantages of the invention shall become apparent as the description thereof proceeds when considered in connection with the accompanying illustrative drawings.

BRIEF DESCRIPTION OF THE DRAWINGS

The novel features that are characteristic of the present invention are set forth in the appended claims. However, the invention's preferred embodiments, together with further objects and attendant advantages, will be best understood by reference to the following detailed description taken in connection with the accompanying drawings in which:

FIG. 6A shows high speed wind driving a traditional vertical axis wind turbine;

FIG. 6B shows high speed wind driving the first embodiment of the present invention;

FIG. 7 shows a simulation of wind velocity through the turbine housing of a third second embodiment of the present invention;

FIG. 11A shows a top view of the embodiment of FIG. 10 showing how the chamber diameter changes in response to wind speed as the stators adjust;

FIG. 14 shows the typical stator displacement versus wind speed curve for a 5 kW enclosure.

DESCRIPTION OF THE PREFERRED EMBODIMENT

Figure 1:
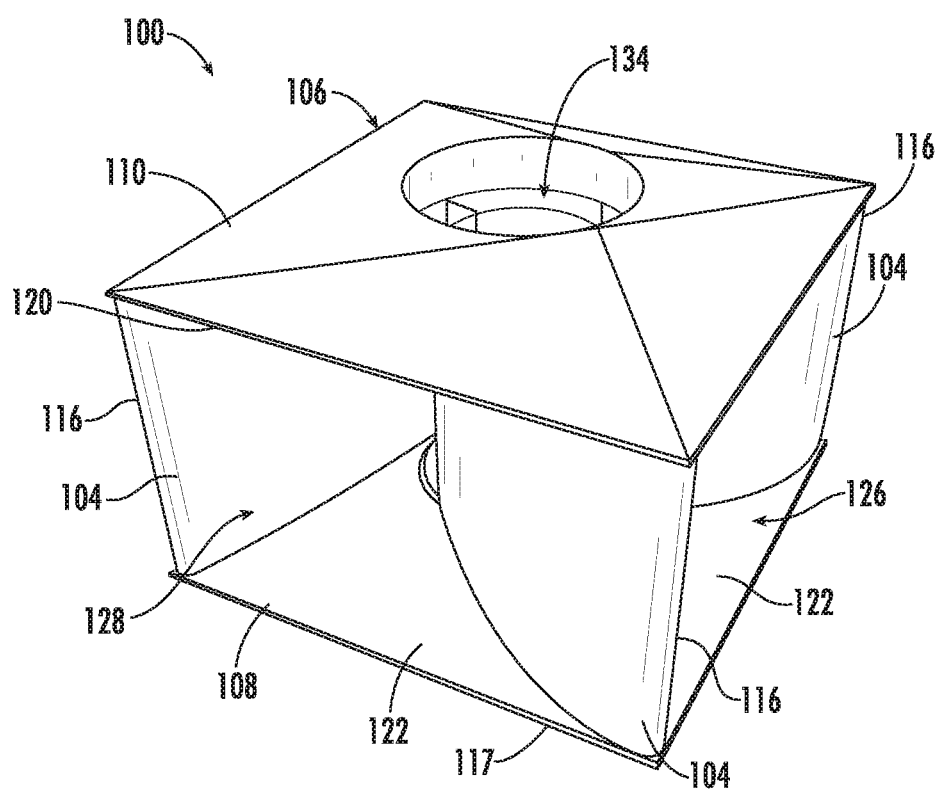
FIG. 1 is a perspective view of a first embodiment of the wind turbine of the present invention.

Referring now to the drawings, embodiments of the wind turbine of the instant invention are illustrated and generally indicated in FIGS. 1-14 as will hereinafter be more fully described, the instant wind turbine provides a fixed housing that encloses a vertical axis rotor for powering a generator.

On the eastern seaboard, the timing of high wind periods coincides with peak demand for power. The wind energy conversion system of the present invention can be positioned at locations where power is needed. The wind turbine of the present invention is designed to simplify the permitting process and reduce transportation costs.

The wind turbine of the present invention is a vertical axis wind turbine (VAWT) 100 that has a rotor 102 and stators (or, alternatively, stator vanes) 104 that are supported within, and protected by, a housing 106. The housing 106 has a platform 108 at its lower end and a roof 110 at its upper end, with the roof 110 positioned above and extending over the platform 108. The platform 108 and roof 110 are substantially horizontal and substantially parallel to one another. The housing 106 forms a stationary enclosure during operation of the wind turbine 100. It is secured to a support structure or a support frame that encloses an electrical power generator coupled to the wind turbine 100.

Figure 2:
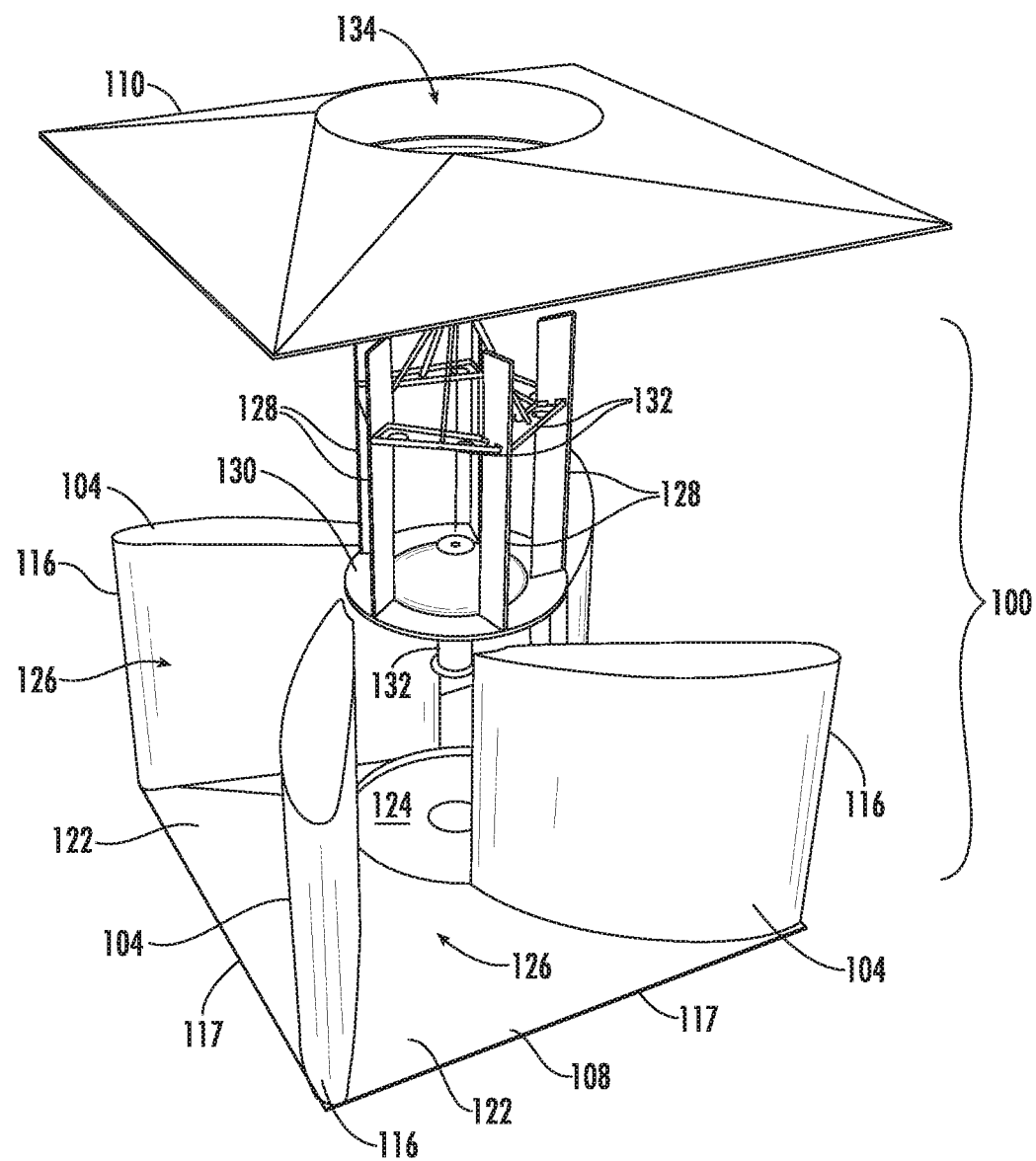
FIG. 2 is an exploded view thereof.
Figure 3:
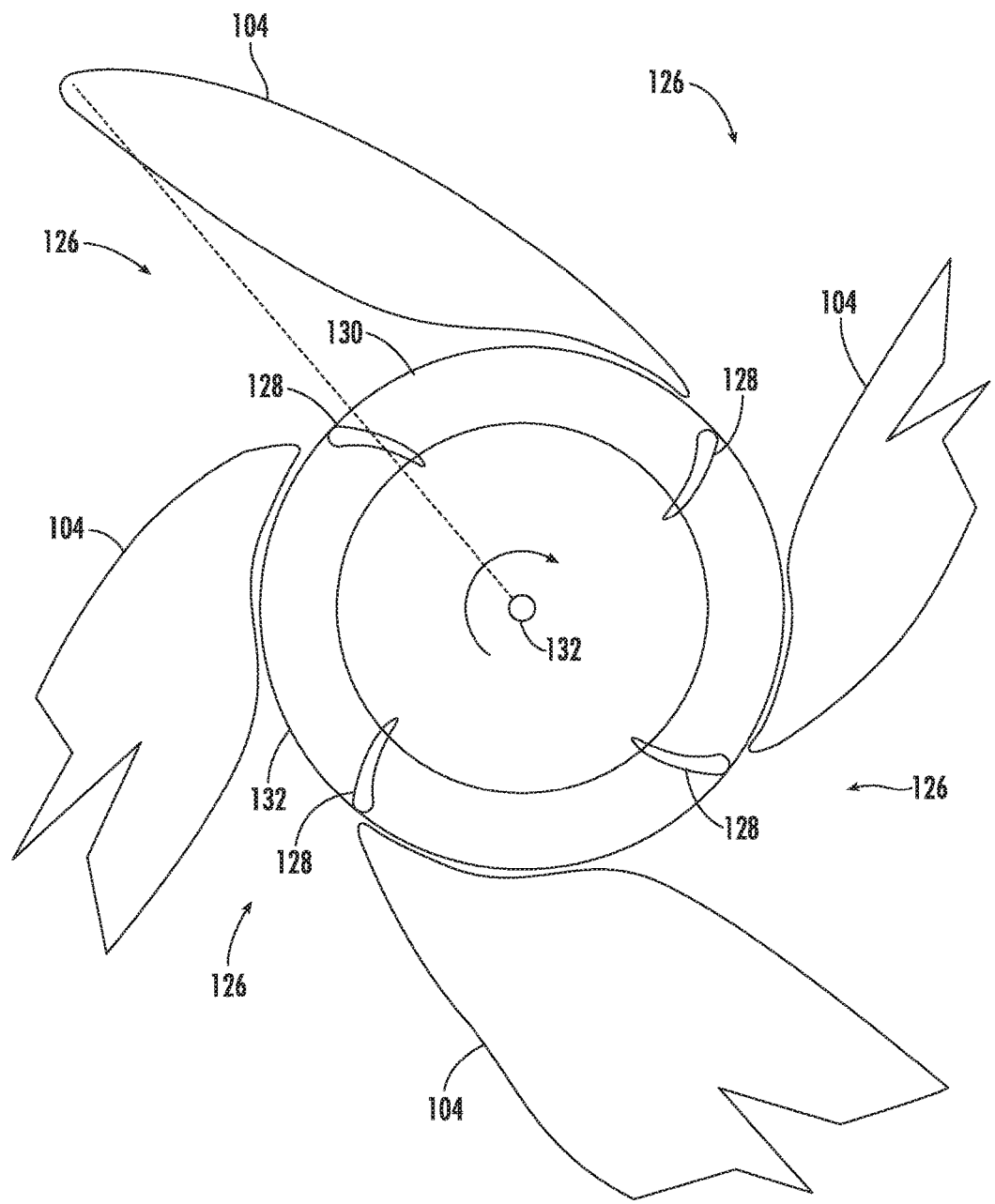
FIG. 3 shows a plan view of the rotor and stator in a wind turbine of the 4-stator embodiment present invention.

Stator vanes 104 extend between the platform 108 and the roof 110 for guiding air into the inner chamber of the housing 106 and turning the rotor 102, as discussed in more detail below. As shown in FIGS. 1-3, the first embodiment has four stator vanes 104. Development work done since the first embodiment has demonstrated that a larger number of flat, thin stators are more effective.

In the embodiment 400 of FIGS. 9-12, the stator vanes 104, such as numbering eight as shown, are constructed of airframe structures covered in aluminum sheeting or fiberglass. The stators 104 are dimpled or otherwise textured to facilitate accelerated, laminar airflow into the chamber (or, alternatively, inner chamber) 124. Each stator vane 104 is substantially planar and segmented into two sections 112, 114, a fixed section 112 having a leading edge 116 towards the outer peripheral edges of the housing 106, and a hinged section 114 attached to the fixed section 112 and with a trailing edge 118 towards the inner chamber 124 of the housing 106. When the stator sections 112, 114 are in line during the resting state they are situated at an angle of 60 degrees to the tangent of the chamber perimeter. The inner chamber 124 is defined within the housing 106 by a circle that passes through the trailing edge 118 of each of the stator vanes 104.

Guiding surfaces 120, 122 on the platform 108 and roof 110 further help to direct wind into the inner chamber 124. A first guiding surface 120 on the bottom side of the roof 110 and a second guiding surface 122 on the upper side of the platform 108 are shaped to direct wind into the inner chamber 124. Together, the first guiding surface 120, the second guiding surface 122, and adjacent stator vanes 104 define an inlet 126 and an airflow path for guiding wind between the platform 108 and roof 110 and into the inner chamber 118. Each inlet 126 has an edge defined by the peripheral edge of the platform 108, the peripheral edge of the roof 110, and the leading edges 116 of the adjacent stator vanes 104. The wind turbine 100 shown in FIG. 1 and FIG. 2 has four inlets 126, because there are four stators 104.

When wind is intercepted by the inlets 126, it is concentrated within the airflow paths as it is directed towards the rotor 102 in the inner chamber 124 of the housing 104. The first guiding surface 120 slopes downwardly from the peripheral edge of the roof 110 of the housing 104 towards the inner chamber 124. The second guiding surface 122 slopes upwardly from the peripheral edge of the platform 108 of the housing 106 towards the inner chamber 124. Thus, each airflow path is narrower near the inner chamber 124 than it is near the inlet 126. This increases the magnitude of the velocity and the pressure of the air acting upon the rotor 102.

Figure 8:
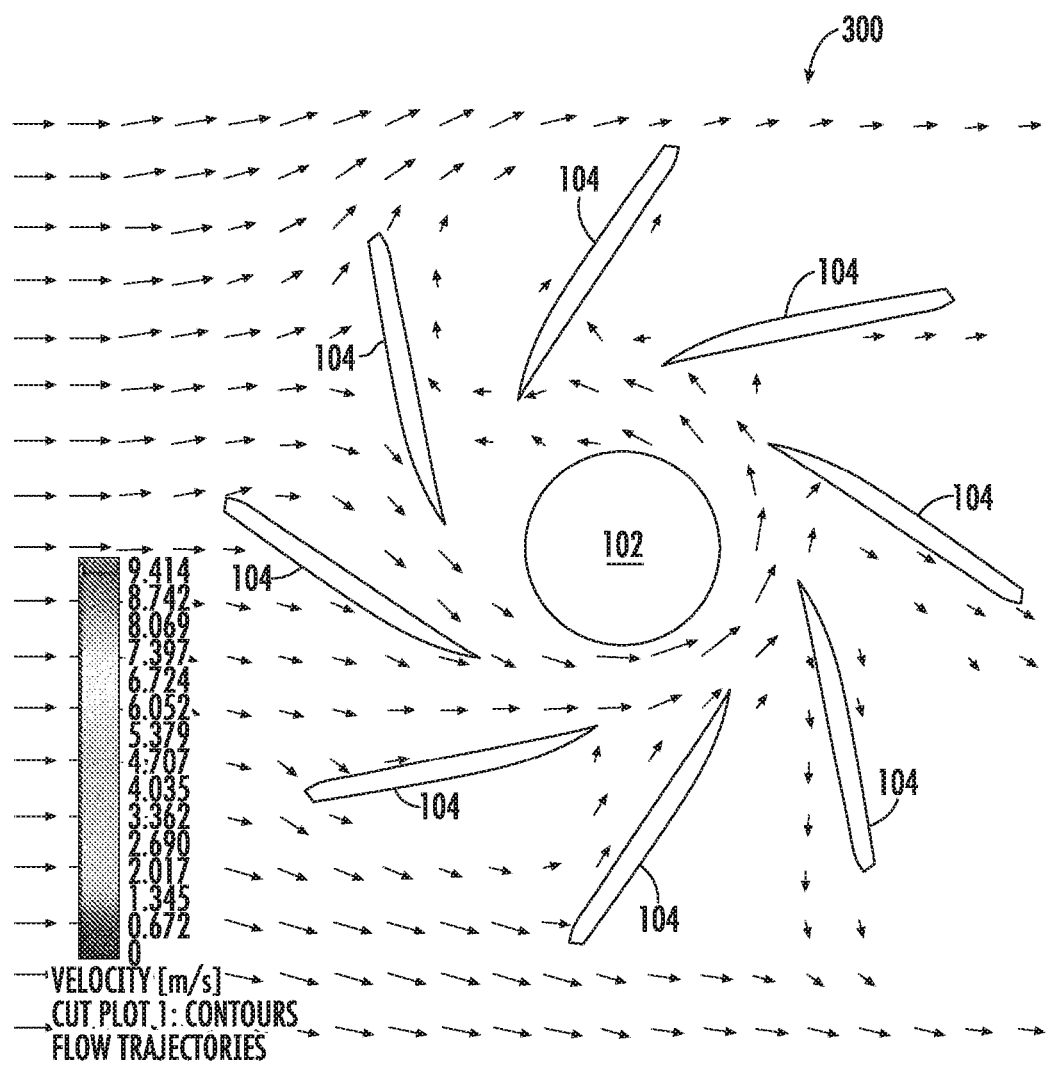
FIG. 8 shows another cut plot thereof.

Because the stator vanes 104 in the embodiments illustrated in FIGS. 8-12 are evenly spaced apart along the perimeter of the housing 106, each airflow path is offset by 45° from the adjacent airflow paths as shown in the plan view of FIG. 8. Thus, the wind turbine 400 of the present invention is omnidirectional, rather than uni-directional, and is capable of performing in volatile wind conditions. As wind direction changes, the wind is automatically directed through a different airflow path within the housing 106. A user does not need to reposition the housing 106.

The stators 104 are arranged in such a way that the concentrated wind is directed to the downwind side of the wind turbine 100. The stator 104 directs the air onto the rotor blades (or, alternatively, blades) 128 of the rotor 102 to increase the amount of work done by the wind on the blades 128 and reduce the amount of drag on the blades 128. This is different from a traditional vertical axis wind turbine (VAWT) where both the downwind and upwind sides of the wind turbine 100 are subjected to the same wind. The leading edge 116 of each stator vane 104 is adjacent to the peripheral edge of the housing 106, and located at a corner of the housing 106. The plan view in FIG. 3 shows that the stators 104 are set at an angle to a radial line extending from the center of the housing 106. This helps direct air circumferentially within the inner chamber 124, rather than directly through the center of the inner chamber 124. The plan view of FIG. 11A shows how this angle changes as the direction of the wind entering the enclosure changes.

Wind guided into the inner chamber 124 rotates the rotor 102, which powers the generator.

The inner chamber 124 is substantially cylindrical, and has a vertical axis at its center. A rotor 102 is positioned within the inner chamber 124 so that the rotational axis of the rotor 102 is substantially collinear with the vertical axis of the inner chamber 124. The rotor 102 may have a disc (rotor base) 130 that is rotatably supported on the platform 108 and within the inner chamber 124. Rotor blades 128 are secured to the rotor base 130 and extend upwardly from the rotor base 130. The rotor blades 128 are substantially equally spaced apart. The upper ends of the rotor blades 128 are secured to each other by brackets 132 extending between the rotor blades 128. The axis of the rotor 102 may be supported rotatably to the roof 110 of the housing 106. A shaft 134 may extend from a bottom of the rotor base 130 for driving a generator.

FIG. 2 shows a wind turbine having 5 rotor blades 128. Preferably the number of rotor blades 128 is selected optimize the rotor dynamics. Having an odd number of rotor blades 128 prevents a rotor blade 128 from being 180° opposite from the rotor blade 128 receiving maximum push. If there are four blades 128 and four stators 104, it is possible not to have a blade 128 in the high speed area of the inner chamber 124 for a given moment, which would impede startup. Increasing the number of rotor blades 128 increases the mass of the rotor 102, increases the air resistance of the rotor blades 128, and increases the cost of manufacturing the rotor 102. In one embodiment, the wind turbine 100 may include four (4) rotor blades 128 in an eight (8) stator 104 housing 106.

Positioning the rotor blades 128 at an angle to the radial line from the center of the housing 106 provides more torque, but requires more wind to start the rotor 102.

A small diameter of the rotor disc 130 increases the rotational speed of the rotor 102 at a given air flow rate. However, the inner chamber 124 must be large enough to house a rotor 102 with significant blade area to generate sufficient force to turn generator and the volume of the inner chamber 124 needs to be large enough to expel intake air without causing back pressure.

Figure 4:
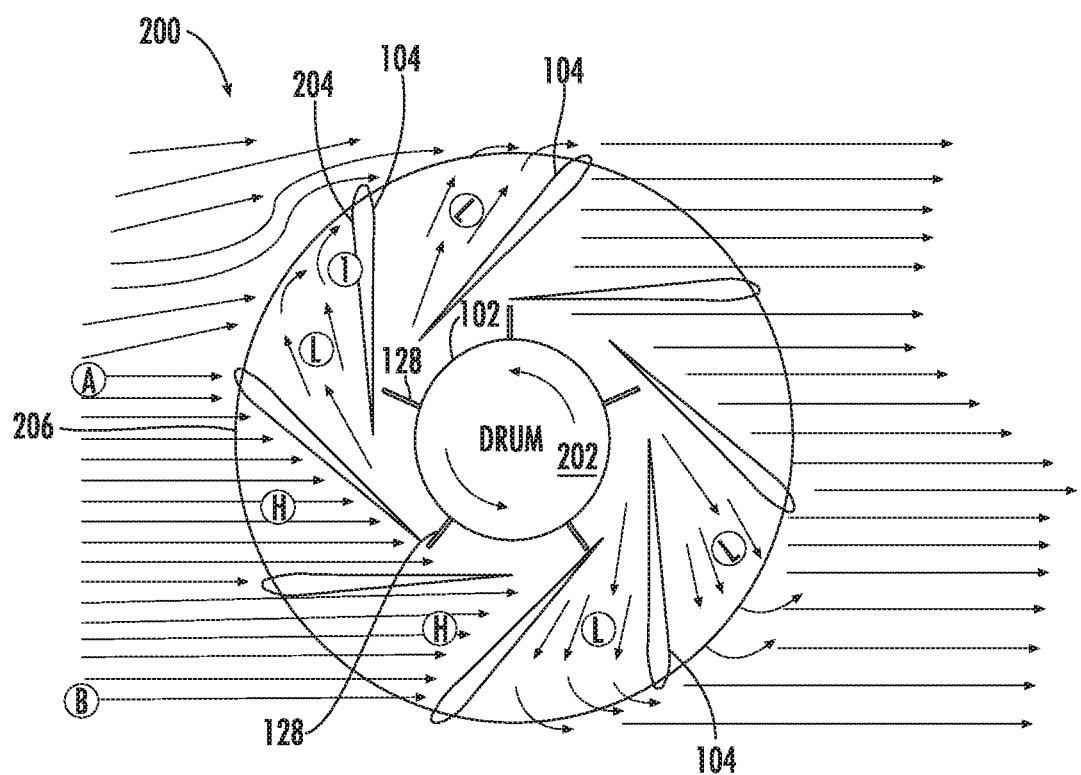
FIG. 4 shows a plan view of a second embodiment of the present invention.

FIG. 4 shows a second embodiment 200 of the present invention, having rotor blades 128 formed on a drum 202 that rotates within the inner chamber 124. The drum 120 replaces the disc 130 in the previous embodiment 100. The drum 202 has a solid, substantially cylindrical outer surface, and rotor blades 128 are secured to the outer surface of the drum 202. This second embodiment 200 may include a housing 106 having a 24-foot diameter, an inner chamber 124 having a 12-foot diameter, a drum 202 having an 8.5-foot diameter, and a 1.75-foot wide chamber opening.

Airflow within the inner chamber 124 is directed circumferentially around the drum 202, driving the rotor blades 128 formed on the drum 202. The embodiment 200 of FIG. 4 has 5 rotor blades 128 substantially evenly spaced apart around the circumference of the drum 200. This second embodiment 200 has eight stators 104, which allows for improved response to a wider range of wind directions.

FIG. 4 shows high pressure areas and low pressure areas within the housing 106, marked by H and L, respectively. The attack angle of the "upper" surface of the airfoil at 204 affects the pressure differential in the area adjacent the upper surface of airfoil. Increasing the angle of attack causes a decrease in the velocity of the wind escaping. At a certain point, this opening becomes an intake.

The area between points A and B is an intake window. On a 24-foot wide housing 106, the intake window will be about 15 feet when the wind direction with respect to the stators 104 is as shown in FIG. 4.

Changing the direction of the wind with respect to the housing 106 changes the airflow through the housing 106. Because there are eight stators 104, a 45° shift in the incoming wind direction results in the same airflow pattern shown in FIG. 4, but through different stators 104 than the ones shown. For example, a 45° shift in the wind direction (so that the wind comes from the upper left part of FIG. 4) would cause in the airflow at 204 to be the airflow that is shown at 206 in FIG. 4. That is, the area of escaping air at 204 would become an air intake. A wind shift of 22° from the orientation shown in FIG. 4 would behave substantially the same as the orientation shown in FIG. 4.

The throat opening of an inlet 126 is determined by the width of the inner chamber 124.

The design can be adjusted to compensate for a reduced intake window width by reducing the width of the inner chamber 124 and the throat opening accordingly.

Figure 5B:
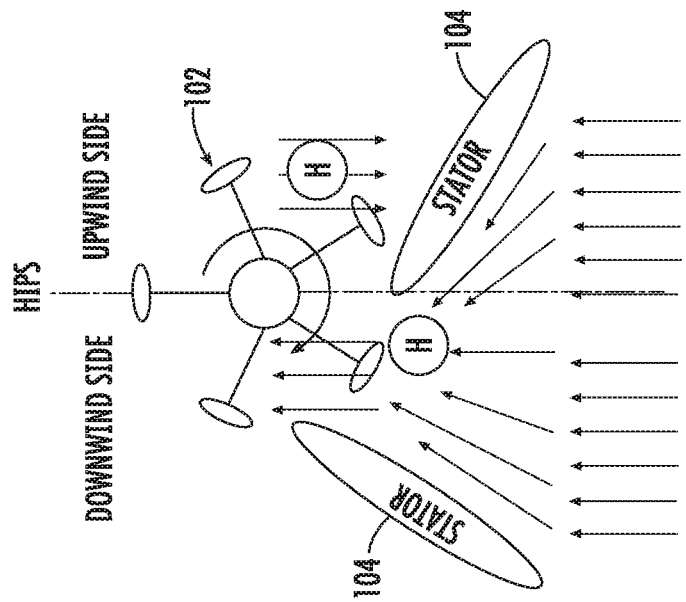
FIG. 5B shows low speed wind driving the first embodiment of the present invention.
Figure 5A:
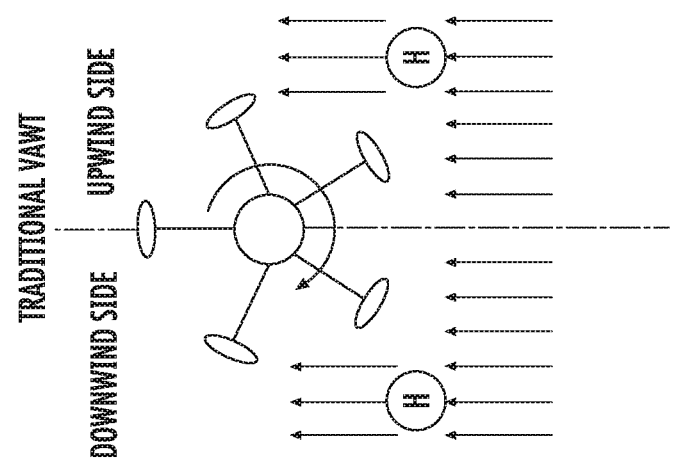
FIG. 5A shows low speed wind driving a traditional vertical axis wind turbine.

FIGS. 5A and 5B show how the stators 104 guide the wind in the present invention to provide a wind turbine with an improved response to wind. In 5A, the wind acts equally on the downwind side of the vertical axis wind turbine. The wind pushes the turbine in the desired direction of rotation on the downwind side, but opposes the rotation of the turbine on the upwind side. In contrast, the stators in 5B direct the wind to the downwind side, creating a high pressure area on the downwind side and a low pressure area on the upwind side, and a turbine that facilitates rotation.

However, this pressure differential depends upon air flow. Once air enters the inner chamber 124, it must be allowed to exit, or else back pressure will impede airflow and remove the differential. Air can exit the housing through the aperture 134 in the roof 110 or between stators 104, as shown for example in FIG. 4.

Only two windward stators 104 are shown in 5B for the purposes of clarity, but a different number of stators 104 could be provided.

FIGS. 6A and 6B show the improved response of the present invention in high wind relative to a traditional vertical axis wind turbine. In FIG. 6A, the vertical axis wind turbine is an open ended system in which faster wind causes the turbine to spin faster. FIG. 6B shows that an increase in wind speed eventually causes the enclosure to effectively behave as a solid structure, with wind flowing around rather than through the structure.

FIGS. 7 and 8 show simulated velocity profiles for air within a third embodiment 300 of the present invention. In these simulations, the incoming wind speed is approximately 8 meters per second, coming from the left side of the image towards the right. The maximum velocity within the structure is adjacent the drum, at roughly 9.4 meters per second. The minimum velocity is 0 meters per second.

In the plan view of FIG. 3, the rotor blades are shown as having a curvature in the opposite direction of the rotation of the rotor. In some embodiments, a rotor blade may have a cross section having a parabolic or elliptical nose portion.

An aperture 132 may be defined in the roof 110 above the inner chamber 124 so that air exits the inner chamber 124 through the roof 110. Air exits partially through the aperture 132 in the roof 11—and partially from the leeward side of the housing 106 by the rotor blade 128 geometry on the leeward side. The present invention creates a whirlwind/vortex in the inner chamber 124, which in earlier embodiments was thought to require an open top. The aperture 132 in the roof 110 was thought to relieve pressure within the inner chamber 124, thereby maintaining maximum pressure differential between the windward side of the enclosure, the leeward side of the enclosure, and the inner chamber 124. It was found in subsequent embodiments that the aperture 132 impeded performance and that a solid roof 110 with a solid rotor 102 assembly with fewer blades 128 performed optimally.

The rotor 102 powers a generator by way of a shaft 134. The shaft 134 is secured to the disc (or drum) 130 of the rotor 102 and depends downwardly from the disc (or drum) 130 for engaging a generator that is located below the housing 106. The shaft 134 is substantially collinear with the vertical axis of the inner chamber 124.

The wind turbine intercepts enough wind to power a 100 kW-1 MW generator without significantly increasing the moving mass of the turbine blades and keeping the moving mass of the turbine blades 128 relatively very small compared to the mass of the armature of the generator. Doing so keeps the start up speed naturally low, improves efficiency of the system, reduces noise and keeps the system unnoticed by neighbors. This very small ratio of rotor mass to armature mass mitigates the balance problem and makes this smaller, simpler turbine more durable, simpler to maintain, and costs less than existing equipment.

There is no moving adjusting mechanism to orient the turbine into the wind, and the rotor blades 128 are substantially protected within the housing 106 from the elements and impact from flying objects or creatures.

The wind turbine of the present invention is self-braking and/or speed limiting to prevent or limit rotation of the shaft. It is capable of responding to extreme wind conditions as a solid structure, eliminating the hazards that accompany existing designs and reducing cost by eliminating a complex blade yaw system and braking system. At high wind speeds, the wind sees the enclosure as a solid object and flows around the structure, so the rotor blades 128 are not exposed to undesirably high wind speeds.

The wind turbine of the present invention preferably can sustain 100 mile per hour winds without being damaged by the wind.

For additional power generation, the roof 110 has an upper surface that is capable of supporting a solar power panel such as a photovoltaic panel. The solar panel may be connected to the power grid.

A designer can configure the housing 106 and the support structure to take any number of forms in various embodiments, as needed to blend in with existing infrastructure. As shown in FIGS. 1-2, the wind turbine of the present invention is constructed to be basically cubic in shape, but it is possible to modify its size, proportions, trimming, and number of stators to achieve the appearance of other structures. For example, the wind turbine is capable of being modified or incorporated into another structure to provide the overall appearance of a structure such as a cupola, watch tower, additional floor of the building or lighthouse, or a widow's walk. Similar structures are possible, as may be required to comply with historical district regulations.

Figure 9:
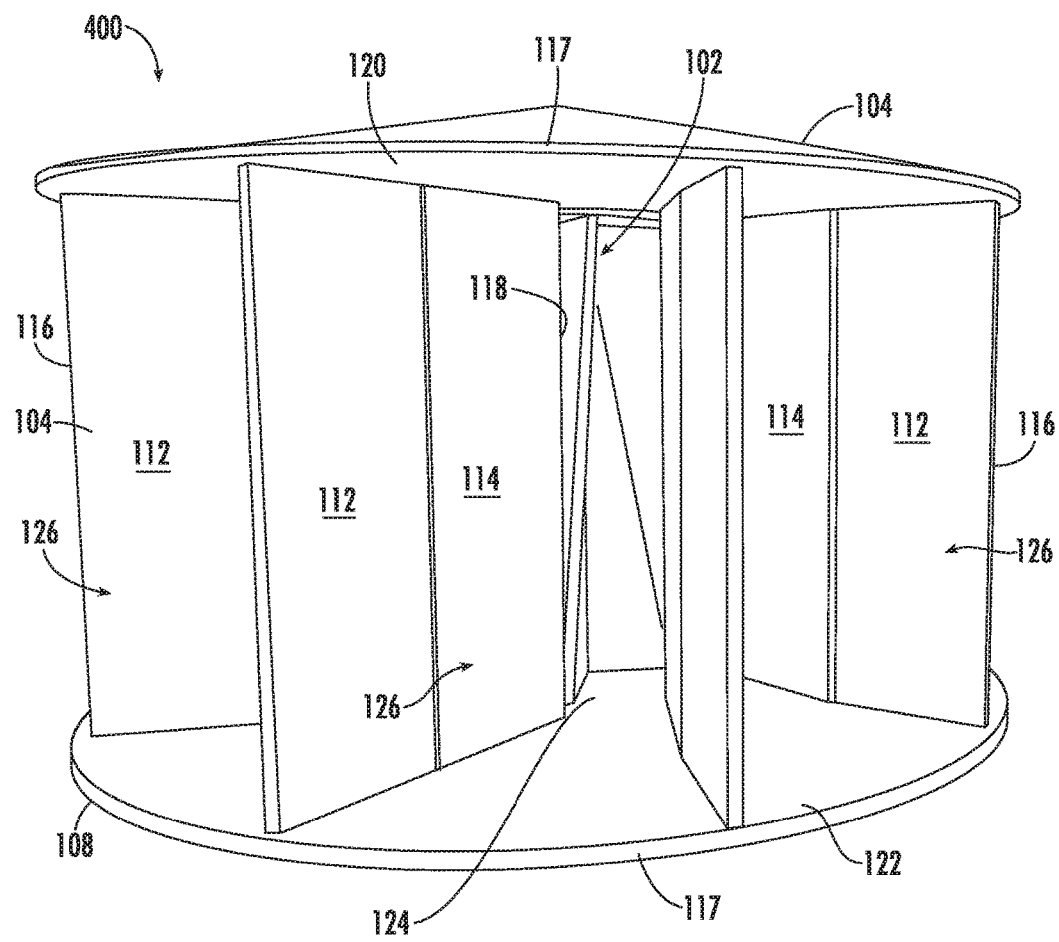
FIG. 9 shows a front perspective view of a further embodiment of the wind turbine of the present invention.

FIG. 9 shows an exemplary embodiment 400 of a wind turbine with segmented stator vanes 104 and a solid roof 110 (i.e. lacking an aperture). The segmented stator vanes 104 include a fixed segment 112 and a hinged segment 114.

Figure 10:
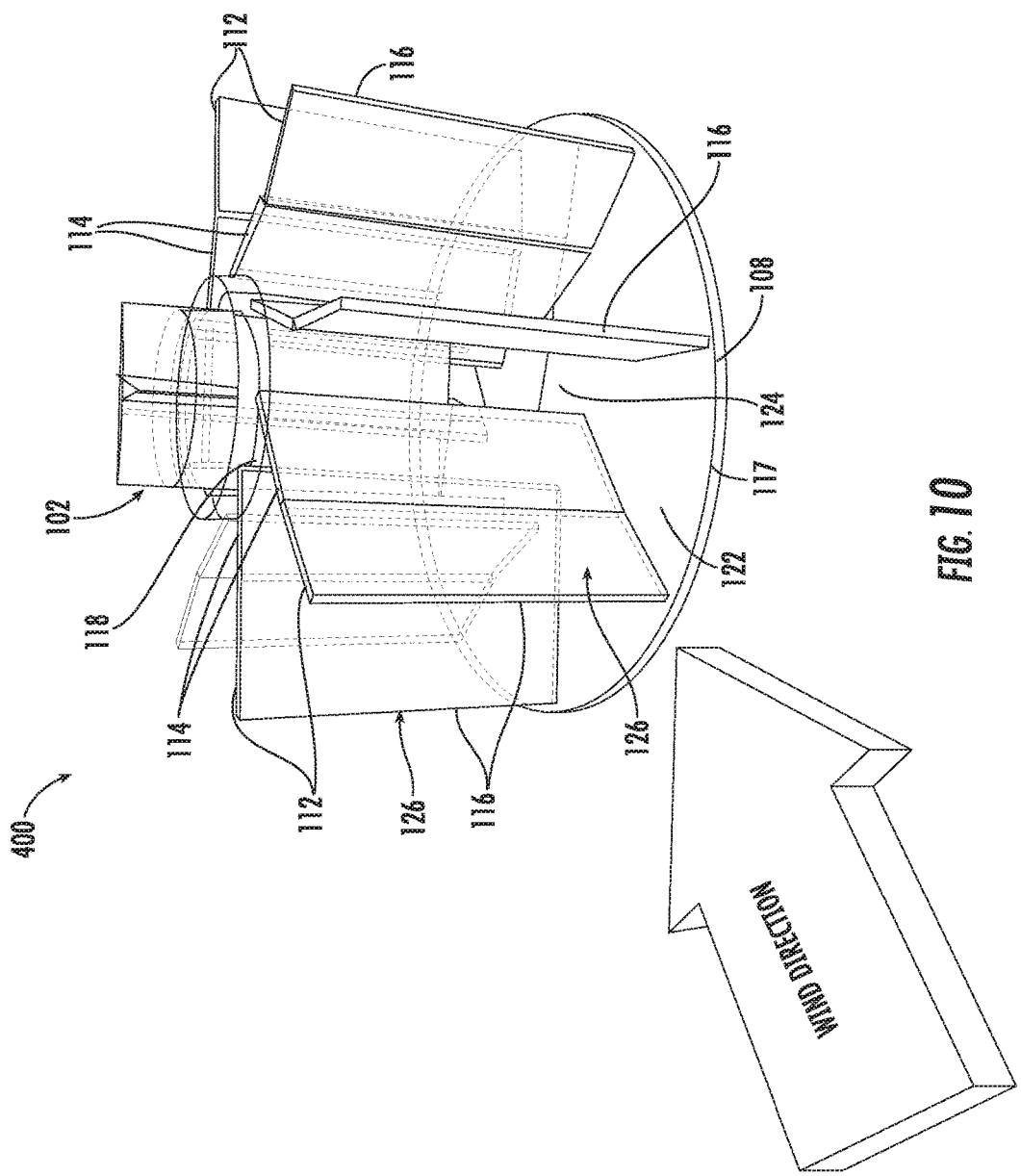
FIG. 10 shows an exploded view of the embodiment of FIG. 9 with the roof removed for illustration purposes.

FIG. 10 shows the change in chamber diameters. The minimum chamber diameter is present in under wind conditions in which the inner segment 114 of each stator vane 104 is in line and sufficiently planar to the outer fixed segments 112; the inner chamber 124 diameter expands as the hinged inner segments 114 of each stator 104 adjusts according to its position relative to the wind, the wind speed and the rotor speed; the stator vanes 104 assume a kinked shape. The windward stator maintains its planar shape to inject the air flow properly into the inner chamber 124.

FIG. 11A shows a sectional view from the top of the present embodiment showing the varied positions of the stator vanes 104 relative to the wind.

Figure 11B:
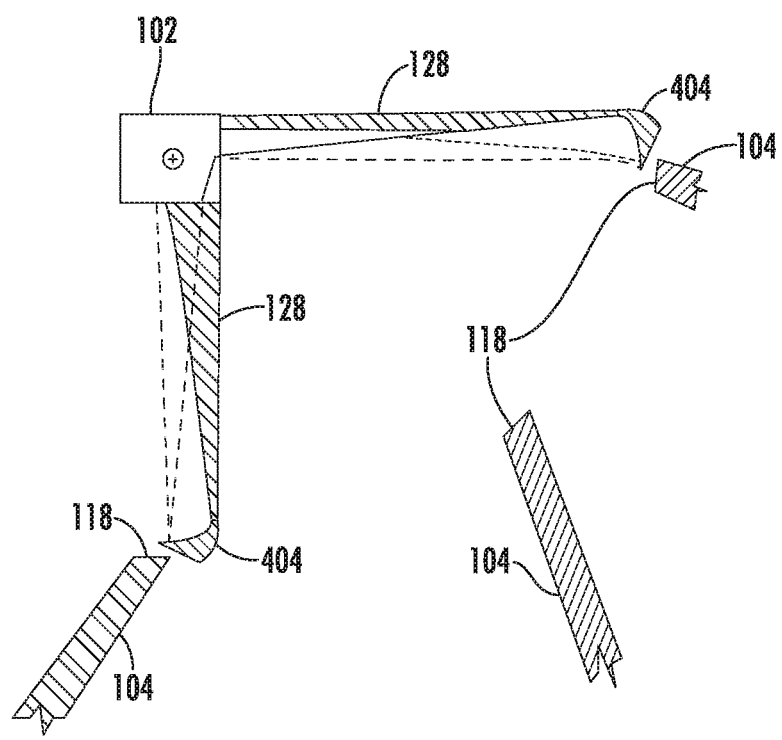
FIG. 11B shows a close-up view of inset 11B of FIG. 11A showing the tips of the rotors passing ends of the stators.

FIG. 11B shows a closeup view of Inset 11B of FIG. 11A, showing the tips (and winglets 404) of the rotor blades 128 moving past the trailing edges 118 of the stators 104. As shown in FIG. 11B, winglets 404 provide a surface substantially perpendicular to face of the windward stator and the airflow coming off of it. Further, as shown in FIG. 11B, inside of winglet 404 creates a high pressure pocket at blade tip.

Figure 12:
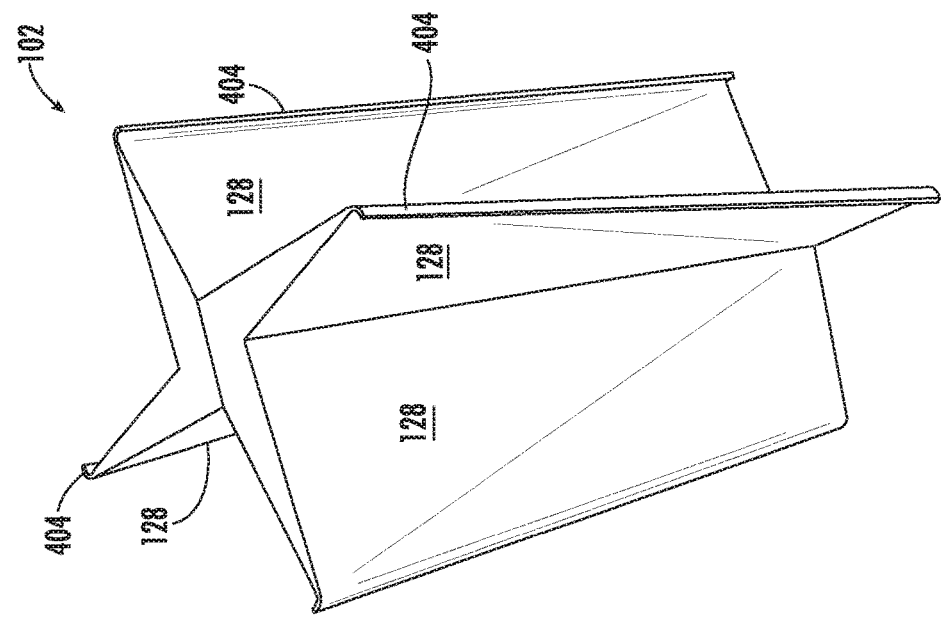
FIG. 12 shows a side elevation view of the rotor used in the embodiment of FIG. 9.
Figure 13:
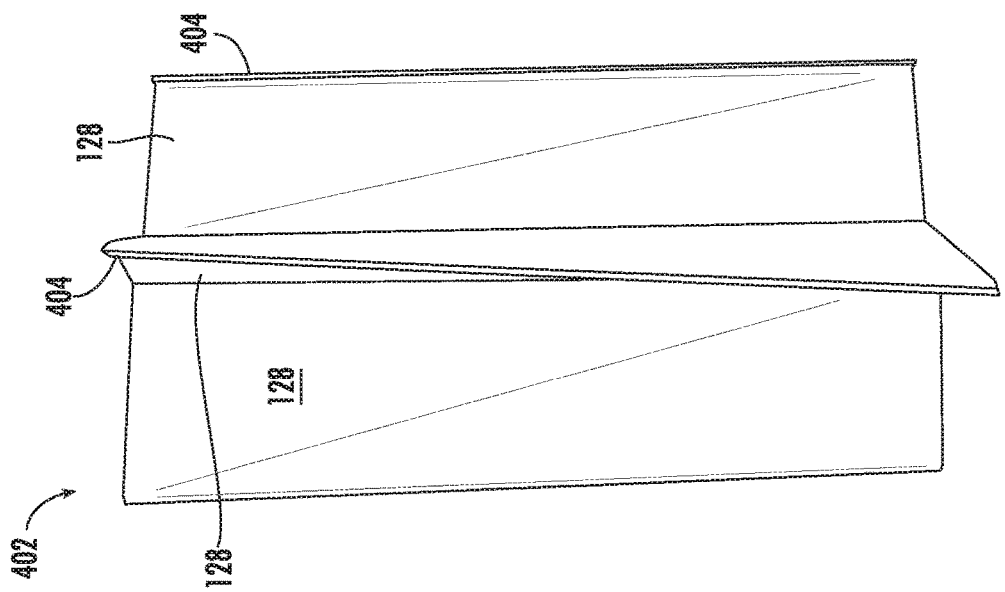
FIG. 13 shows a top perspective view of the rotor used in the embodiment of FIG. 9.

FIGS. 12 and 13 show an exemplary embodiment of the rotor 102. The most notable features are the small drum diameter (approximately $\frac{1}{10}$ chamber diameter), the obtuse angles of the between the windward and leeward blade surfaces facilitating airflow, the helical twist, spanning an entire inlet opening as shown, of the blades 128 to prevent the top-dead center stalling condition and the winglets 404 at the tips of the rotor blades 128.

FIG. 14 shows a typical Wind Speed v. Trailing Edge of Inner Stator Vane Displacement curve for 5 kW embodiment, illustrating how the wind turbine advantageously and dynamically self-configured for optimal use based on existing wind conditions. As graphically shown, the stators 104 return to optimum windward angle in under wind conditions. The stators 104 open to minimize pressure interference between rotor tips and stator vanes in sufficient wind conditions. In over wind conditions, the stators 104 open further to close off the inner chamber 124.

Additionally, the size and weight distribution of the wind turbine allow it to be mounted on a commercial building, similar to a commercial HVAC unit. Thus, the device becomes technician-friendly, which lowers maintenance cost. Mounted on an existing roof, the wind turbine does not clutter the viewscape. It can be mounted in historical districts, and is easy to install.

It can therefore be seen that the vertical axis wind turbine of the present invention provides mostly stationary structure, with a rotatable turbine concealed within a stationary housing. The wind turbine is low maintenance. The device appears solid in high winds and becomes self speed-limiting. Birds and bats avoid the structure. It has a stationary shadow because the rotor is within the housing, and it absorbs what little noise and vibration it makes. Ice cannot fall from the blades onto the surroundings because the blades are within the housing.

The wind turbine of the present invention is compatible with the intended purpose of the turbine installation site. For example, it does not interfere with operations of an airport. The wind turbine operates unnoticeably by the immediate neighboring community. This allows wind energy to be harvested close to the population its energy is intended to serve, solving the significant challenge of power transport.

Eliminating the neighbor objections above mitigates many community objections, which arise during and delay the permitting process. Consequently, a permit for installation may be acquired more rapidly and at substantially lower cost, improving the return on investment in the wind turbine project.

For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A vertical axis wind turbine, comprising:
a housing having a platform and a roof positioned above the platform, a first guiding surface on the roof and a second guiding surface on the platform for guiding airflow between the platform and the roof;
a plurality of stator vanes extending substantially vertically between the platform and the roof, each stator vane having a leading edge and a trailing edge;
an inner chamber defined by a circle passing through the trailing edges of the plurality of stator vanes;
a plurality of inlets defined by the leading edges of an adjacent pair of stator vanes, an outer edge of the roof and an outer edge of the platform, configured and arranged to direct air between the platform and roof and into the inner chamber;
a vertical axis at the center of the inner chamber; and
a rotor positioned within the inner chamber and rotatably supported on the platform, the rotor configured and arranged to rotate about the vertical axis of the inner chamber;
wherein the stator vanes, first guiding surface, and second guiding surface direct air into the inner chamber to rotate the rotor relative to the platform,
wherein each of the plurality of stator vanes comprises a fixed outer segment and a hinged inner segment, a leading edge of the inner segment is hinged to a trailing edge of the outer segment, and
wherein a diameter of the inner chamber is dynamically adjusted in response to changing wind speed and direction as the inner segments of the stator vanes move on their hinges.

2. The wind turbine of claim 1, wherein the outer fixed segment extends outward radially at roughly 60 degrees from the tangent line from a circumference of the inner chamber.

3. The wind turbine of claim 1, the inner segment opens to about 45 degrees from the tangent line from a circumference of the inner chamber.

4. The wind turbine of claim 1, wherein the inner segment opens further to a position to substantially close the chamber in over wind conditions.

5. The wind turbine of claim 1, wherein each segment comprises of substantially planar surfaces on both sides.

6. The wind turbine of claim 1, wherein the number of inlets is equal to the number of stator vanes.

7. The wind turbine of claim 1, wherein the rotor comprises a plurality of rotor blades secured to the rotor.

8. The wind turbine of claim 7, wherein the rotor blades are pitched vertically and substantially helical, adjacent pairs of rotor blades having a span sized to a throat opening defined by the trailing edges of adjacent pairs of stator vanes, thereby preventing a top dead center condition.

9. The wind turbine of claim 7, wherein each of the rotor blades further comprises a small vertical winglet with windward pocket, the winglet focusing high pressure at a tip of a rotor blade.

10. The wind turbine of claim 7, wherein each of the rotor blades is spaced apart, each rotor blade having windward and leeward surfaces at obtuse angles, thereby preventing significant backpressure on a following rotor blade.

11. The wind turbine of claim 1 further comprising a shaft secured to the rotor and depending downwardly from the rotor, the shaft being substantially collinear with the vertical axis of the inner chamber.

12. The wind turbine of claim 11, wherein the shaft is further configured and arranged to drive a generator.

13. The wind turbine of claim 1, wherein a diameter of the rotor is smaller than a diameter of the inner chamber.

14. The wind turbine of claim 1, wherein the roof further comprises a surface defining an aperture through the roof, wherein the aperture is centered about a vertical axis of the inner chamber.

15. The wind turbine of claim 7, wherein each of the rotor blades further comprises a winglet extending from a wing tip portion of each rotor blade, respectively.

* * * * *